July 15, 1958
E. W. WILKINS
2,843,814
MEANS FOR VARYING THE SPEED OF SINGLE
PHASE ELECTRIC INDUCTION MOTORS
Filed Sept. 5, 1956
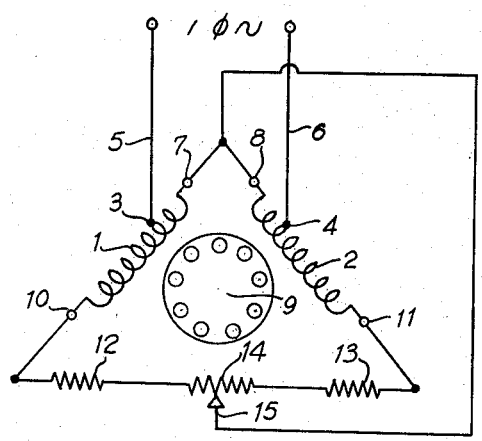
INVENTOR
Edward William Wilkins
BY
ATTORNEY

United States Patent Office 2,843,814
Patented July 15, 1958

2,843,814

MEANS FOR VARYING THE SPEED OF SINGLE PHASE ELECTRIC INDUCTION MOTORS

Edward William Wilkins, Swindon, England, assignor to The Garrard Engineering and Manufacturing Company, Limited, Swindon, England Application September 5, 1956, Serial No. 608,115

Claims priority, application Great Britain September 6, 1955

6 Claims. (Cl. 318—220)

This invention relates to means for varying the speed of single phase electric induction motors, more particularly induction motors used in phonographs or like sound reproducing or recording apparatus.

It is well known to vary and control the speed of phonograph motors, and hence the record turntables, by governor control or other mechanical means, since it is desirable to have some latitude of speed setting, e. g. for "tempo" adjustment. Variable speed governor mechanisms are, however, of considerable weight, size and complexity having regard to their function which while important may only be utilized occasionally. Further, mechanical governor mechanisms, by their very action, absorb power from the motor and therefore reduce its efficiency.

It is an object of the present invention to provide means whereby the rotor speeds of single phase electric induction motors can be varied to a limited extent and controlled electrically as opposed to mechanically.

It is a further object of the present invention to provide such electrical means for varying and controlling the speed of electric induction motors which absorbs a relatively small amount of extra electricity consumption, which in turn means that only small components are needed, and with which speed reductions do not result in any serious loss of power in the rotor shaft output. The smallness of the extra electricity consumption (i. e. increase in wattage) avoids heat dissipation problems which can become acute in the case of, say, phonograph motors, which must be designed for housing in the restricted space of phonograph or radio cabinets.

It is a still further object of the present invention to provide such electrical means for varying and controlling the speed of electric induction motors which require a minimum number of components and only very minor modification of the motor.

The invention consists in means for electrically varying the rotor speed of an electric induction motor comprising a pair of fixed resistances connected one each in parallel with the stator coils of the motor through a common variable resistance or potentiometer (connected itself in series with the two resistances and having its variable tapping connected to the junction of the stator coils) and power input to the stator coils of the motor connected to said coil at a tapping on each coil such that a portion of each stator coil winding lies on each side of the power connection tapping.

The position of the power connection tappings on the stator coils and the value of the fixed and variable resistances depend on the requirement of current consumption and range of speed control, and the voltage of the motor on which the speed is being varied.

By varying the variable resistance or potentiometer so that the value of one or other of the fixed resistances in parallel with the stator coils is augmented while the other is reduced, the degree of shunt applied by the resistances across the coils is varied and in consequence the torque applied to the rotor is varied.

The accompanying drawing is a circuit diagram showing the means, according to the present invention for varying the speed of a single phase electric induction motor.

The stator coils 1 and 2 of the induction motor (having a rotor 9) are tapped at 3 and 4 for connections 5 and 6 to a source of electric current. The ends 7 and 8 of the stator coils 1 and 2 are connected together and the other ends 10 and 11 of the stator coils are connected respectively with fixed resistances 12 and 13. Interconnecting the two fixed resistances 12 and 13 is a resistance 14, which is a variable resistance or potentiometer, the centre (variable) tapping 15 of which is connected to the junction of the stator coils 1 and 2. By this arrangement, the two resistances 12 and 13 are connected each in parallel with, respectively, the stator coils 1 and 2 through the common variable resistance 14 and its variable centre tapping 15. By varying the centre tapping 15 of the resistance 14, the value of one or other of the fixed resistances 12 or 13 is augmented while that of the other is reduced so that the degree of shunt applied by the resistances 12 and 13 to the stator coils 1 and 2 is varied and in consequence the torque applied to the rotor of the motor is varied with consequent variance of the motor shaft rotational speed.

The values of the fixed resistances 12 and 13 and the variable resistance 14, and also the position of the energising tapping 3 and 4 on the stator coils 1 and 2 depend on the voltage of the motor and current consumption requirements, but, for example, a motor to run on 200–250 volt A. C. supply with a speed variation adjustment of, say, plus or minus 3% of its nominal speed, would have its stator coils 1 and 2 each tapped (at 3 and 4) at, say, one third the length of the winding from the end to which the fixed resistances 12 and 13 are to be connected and the values of the resistances can be: resistance 12=10 KΩ, resistance 13=1200Ω, and variable resistance 14=10 KΩ.

I claim:

1. A variable speed single phase induction motor comprising a rotor; a pair of field windings angularly displaced to provide a rotating field, corresponding terminals of said windings being connected to each other at a common junction; each winding having a tap intermediate its ends and the taps being correspondingly located, said taps being adapted for connection to opposite terminals of a source of single phase alternating current; impedance means connected in parallel with each winding between said common junction and the other terminals of the windings; and means operable to vary the proportion of the impedance means in parallel with each winding to vary the speed of said motor.

2. A variable speed single phase induction motor as claimed in claim 1 in which the taps on said winding are substantially one-third the length of each winding from said corresponding terminals.

3. A variable speed single phase induction motor as claimed in claim 1 in which said impedance means comprises resistance.

4. A variable speed single phase induction motor comprising a rotor; a pair of field windings angularly displaced to provide a rotating field, corresponding terminals of said windings being connected to each other at a common junction; each winding having a tap intermediate its ends and the taps being correspondingly located, said taps being adapted for connection to opposite terminals of a source of single phase alternating current; and impedance means connected between the other terminals of said windings and having an adjustable tap connected to said common junction; the speed of said motor being variable by movement of said adjustable tap to vary the proportion of the impedance means in parallel with each winding.

5. A variable speed single phase induction motor as claimed in claim 3 in which said impedance means comprises resistance.

6. A variable speed single phase induction motor as claimed in claim 3 in which said impedance means comprises three resistances in series, said adjustable tap being on the intermediate resistance.

References Cited in the file of this patent

UNITED STATES PATENTS 2,406,193     Carson _____ Aug. 20, 1946